May 5, 1964   J. M. RHOADES   3,132,317
CORE ASSEMBLY FOR A POSITION INDICATING DEVICE
Filed June 12, 1961
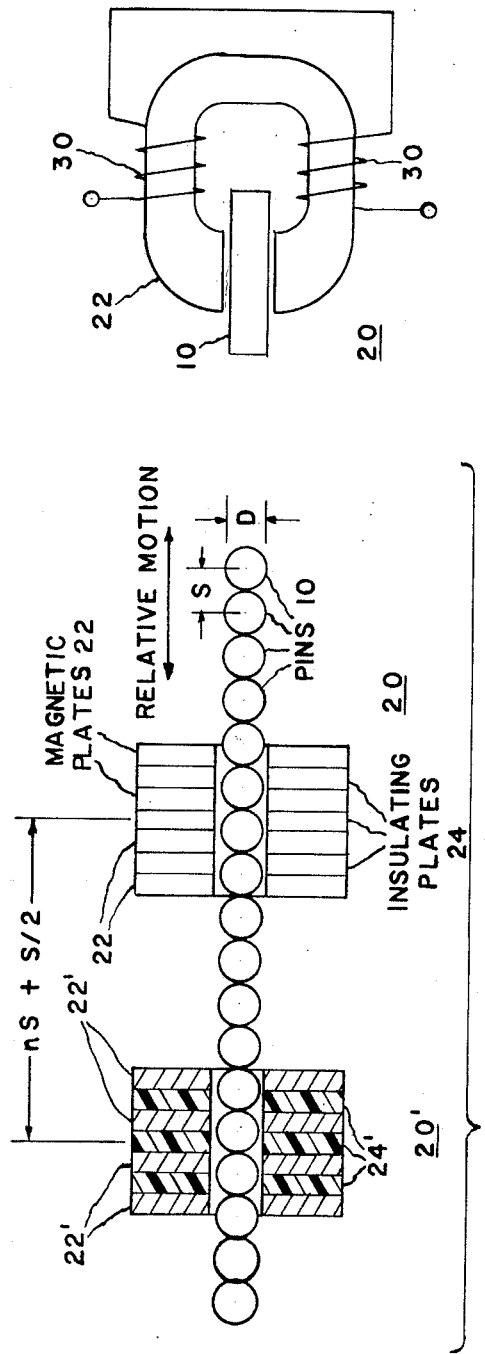
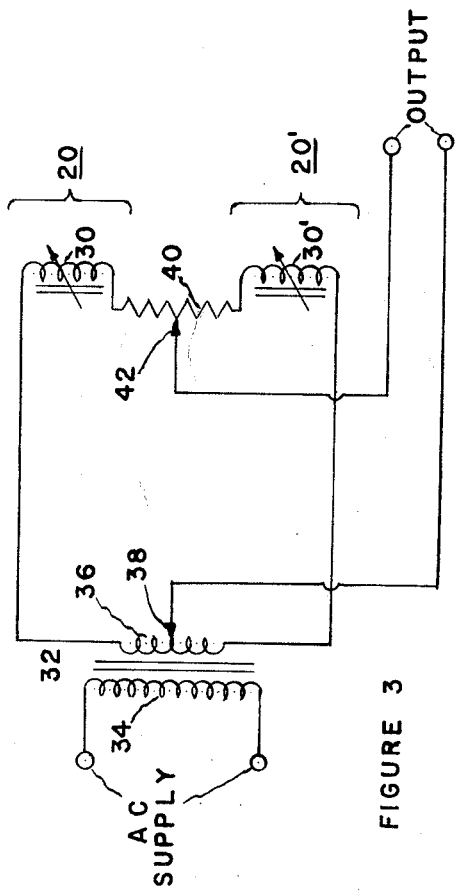
INVENTOR:
JOHN M. RHOADES,
BY James G. Williams
HIS ATTORNEY

United States Patent Office 3,132,317
Patented May 5, 1964

3,132,317
CORE ASSEMBLY FOR A POSITION
INDICATING DEVICE
John M. Rhoades, Waynesboro, Va., assignor to General
Electric Company, a corporation of New York
Filed June 12, 1961, Ser. No. 116,526
4 Claims. (Cl. 336—130)

The invention relates to a core assembly for a position indicating device. The invention particularly relates to a core assembly for use with a position indicating device which utilizes cylindrical pins and the core assembly to provide a signal indicative of relative position of two objects.

An object of the invention is to improve the core assembly disclosed in my Patent No. 3,010,063 entitled "Position Indicating Device," filed April 1, 1959, Serial No. 803,426. In that patent to which reference is hereby made, I disclose a position indicating device which utilizes a bridge network arrangement. One side of the bridge network comprises two substantially similar core assemblies each of which comprises an inductive reactance coupled to a respective core. The inductive reactances are connected in series. The other side of the bridge network comprises a source of alternating current potential having a center tap. The two sides of the bridge are connected together in parallel. One of the two objects whose relative positions are to be indicated is provided with a magnetic material having at least one surface thereof formed by a plurality of substantially similar profiles. Such a surface is easily and preferably obtained by highly accurate and relatively inexpensive cylindrically shaped pins that are made of a magnetic material and that are positioned side by side to provide such a surface. The other of the objects is provided with the two core assemblies. The one object with the pins is positioned relative to the other object with the core assemblies so that the cores and pins move relative to one another along the relative path of travel of the two objects. As the pins and cores move relative to each other, the effective reactances of the inductive reactances are varied because of the change in profile of the pins which appears or which is presented to the cores. An output signal is derived from the bridge between the center tap of the voltage source and the connection between the two reactances, this output signal varying in magnitude and polarity in response to the unbalance in the bridge network. The bridge unbalance varies with the relative position of the cores and the pins. The output signal may vary in phase or amplitude and may be used in a control device to bring about the necessary or desired relative positioning between the two objects. Reference is again made to my patent for a more complete explanation of the operation of the position indicating device just described.

As mentioned in my patent, one preferred embodiment of the cores contemplates cores having a substantially rectangular shape of a predetermined width that is one-half of the pin diameter. While such cores and pins have operated satisfactorily, it has been found that variations in the pin sizes, or variations in the pin locations, or variations in the composition of material in the pins can produce appreciable effects, sometimes quite undesirable, on the output signal derived from the bridge network. Further, it has been found that it is difficult, even under precisely controlled conditions, to mount the pins side by side in a precise relationship and spacing, and that any variation from a precise spacing and relationship also produces undesired effects in the output signals.

Accordingly, another object of the invention is to provide an improved core for use in certain position indicating devices.

Another object of the invention is to provide an improved core that tends to reduce or to eliminate some of the undesired effects which may be present in certain position indicating devices as a result of variations in pin size, variations in pin spacing or position, and variations in pin composition.

Briefly, these and other objects are attained by a core which comprises a plurality of plates of magnetic material and a plurality of plates of insulating material. Each of the plates of magnetic material and each of the plates of insulating material have a thickness, in a preferred embodiment, that is substantially equal to half of the center-to-center profile spacing or pin spacing. The plates are held or fastened together in a stack to form a core assembly that comprises alternate plates of magnetic material and plates of insulating material. The inductive reactance is coupled to the assembled stack. The plurality of plates provides an averaging effect which reduces the undesired effects of variations in pin size, spacing, position, and composition on the inductive reactance. Thus the bridge unbalance and hence the output signal reflect relative position more accurately.

The invention will be better understood from the following description taken in connection with the accompanying drawing and its scope will be pointed out in the claims.

In the drawing:

FIGURE 1 shows an elevation of a core assembly in accordance with the invention, as used with the pins, this elevation showing the ends of the pins;

FIGURE 2 shows an elevation of the core assembly and pins of FIGURE 1, this elevation showing the side of the pins; and FIGURE 3 shows a schematic diagram of the electrical circuit associated with the invention.

In the various figures, the same reference numerals are used to refer to the same elements, and primed reference numerals are used to refer to separate but similar elements. With reference to FIGURES 1 and 2, there is shown a plurality of pins 10 which are made of a magnetic material and which, in a preferred embodiment, are cylindrically shaped with a diameter D. The pins 10 are firmly held by suitable means (not shown) such as a support or clamp so that their cylindrical sides are close to or touching each other, and so that their longitudinal axes are substantially parallel with each other and pass through a predetermined line. The configuration of this predetermined line depends upon the nature of the relative movement between the two objects whose relative position is to be indicated. The pins 10 are positioned on one of the two objects. As described in my patent, two core assemblies 20, 20' are provided and positioned on the other of the two objects so that their centers are spaced some integral multiple of the pin diameter D plus D/2 apart. While various spacings of the pins 10 may be used, it has been found that better operation may be provided if a slight gap is provided for between adjacent pins. With pins having a diameter of 0.098 inch, a gap of 0.002 inch has been provided between adjacent pins with good results. A gap is preferred in that it facilitates bonding or clamping the pins together. If a gap is provided between adjacent pins 10, then the center-to-center pin spacing S may be used to determine the center-to-center spacing of the core assemblies 20, 20'. As shown in FIGURE 1, this spacing is some multiple n of the pin spacing S plus S/2. The core assemblies 20, 20' and pins 10 are positioned so that they maintain the same location relative to each other as the objects move relative to each other. Since both core assemblies 20, 20' are substantially the same, only one core assembly 20 will be described in detail. The other core assembly 20' is shown with its parts cross-sectioned to indicate the material from which it is made. The core assemblies 20, 20' comprise a plurality of plates 22 made of magnetic material and a plurality of plates 24 of insulating material. The individual plates 22 of magnetic material may be single and solid as shown, or they may be laminated (i.e., thinner sheets placed together to form the individual plates) to help reduce eddy current losses. A suitable magnetic material is an alloy of nickel and iron, such as the metal sold under the trade name of Mu Metal. A suitable insulating material is a plastic or synthetic resin, such as the material sold under the trade name of Textolite. The plates 22 of magnetic material and the plates 24 of insulating material are stacked together to form the core assembly 20 comprising alternate plates of magnetic and insulating material. It is preferred that the plates 22 of magnetic material and the plates 24 of insulating material each have a thickness, as measured along the direction of relative movement, which is substantially equal to one-half the center-to-center pin spacing S along the same direction. If there were no gap between adjacent pins 10, the center-to-center pin spacing S would equal the pin diameter D, and hence the plate thickness would be one-half this diameter D. However, other thicknesses of the plates may be used to advantage in certain instances as will be explained. The core assemblies 20, 20′ may be generally described as being C-shaped as shown in FIGURE 2. The pins 10 pass between the ends of the core assemblies 20, 20′ and present varying amounts or configurations of material to these ends as they do so. Other core shapes and arrangements may be used as mentioned in my patent. Each of the core assemblies 20, 20′ is wound with an inductive reactance or coil 30. As shown in FIGURE 2, the coil 30 is divided into two physical sections for convenience in supporting the core assemblies 20, 20′ on a precision supporting member. However, the two coils 30 may be physically consolidated as a single coil if desired.

The coils 30, 30′ of the two core assemblies 20, 20′ are coupled in the bridge network arrangement shown in FIGURE 3. The bridge network is supplied with an alternating current supply of suitable frequency, say 400 cycles per second. The alternating current supply is applied to the primary winding 34 of a transformer 32, the secondary winding 36 of which is provided with a center tap 38. The ends of the secondary winding 36 are respectively coupled to one end of the two coils 30, 30′. The other ends of the two coils 30, 30′ are coupled to a balancing resistor 40. Output signals are provided from a movable tap 42 on the balancing resistor 40 and the center tap 38 of the transformer 32. These output signals vary as a result of the bridge network shown in FIGURE 3 becoming unbalanced because of the changes in the inductive reactances of the two coils 30, 30′. These changes in reactance result from the change in configuration of the pins 10 between the core assemblies 20, 20′.

One of the problems associated with core assemblies having only a single plate of magnetic material results from variations in pin size, pin position, pin spacing, and pin composition. These variations affect the output signal so that it does not reflect relative position as accurately as it might. These variations are offset in accordance with the invention by the use of a plurality of plates 22 of magnetic material separated by plates 24 of insulating material. While the precise theory or reasoning behind the improvement of the invention is not readily explainable, the improvement may be explained by stating that a plurality of the plates 22 of magnetic material tends to provide an averaging effect on the over-all reactance of the coil coupled thereto. Thus, if a given pin variation affects one of the plates 22 of magnetic material in a given manner, there will be another pin which may or will affect another of the plates 22 of magnetic material in the opposite manner thereby providing an averaging effect which tends to produce a more balanced and consistent output from the variation standpoint. Thus, it has been found that the use of a plurality of plates 22 of magnetic material separated by plates 24 of insulating material tends to produce or provide a signal that is more accurate with respect to relative location and that is less susceptible to extraneous variations than is a signal produced from a single plate core assembly as described in my patent.

As described in my co-pending application, it is possible with the spacing shown in FIGURE 1 to obtain an output signal which varies as a sine wave. In some instances, this output signal may have harmonics of the alternating current supply frequency. It has been found that if the thickness of the plates of insulating material is reduced, say by 15%, below the thickness of the plates of magnetic material, the flux coupling in the individual plates add in a manner to appreciably reduce the harmonic content of the output signal.

From the above description, it will be seen that a core assembly in accordance with the invention provides improved operation over a core assembly as described in my patent. Persons skilled in the art will appreciate that almost any number of plates of magnetic material alternated with plates of insulating material may be used. Thus, as few as two plates of magnetic material separated by a plate of insulating material may be used, or a large number, say ten, of plates of magnetic material may be used with nine plates of insulating material to form the stack of alternate magnetic and insulating plates. And while the invention has been described with reference to a particular embodiment, it is to be understood that modifications may be made by persons skilled in the art without departing from the spirit of the invention or from the scope of the claims.

What I claim as new and desire to secure by Letters Patent of the United States is:

1. A core adapted for use with a device to indicate the relative position of two objects, said device including a plurality of elongated pins of magnetic material each having substantially the same center-to-center spacing along the direction of relative motion of said two objects and being arranged side by side along said direction for mounting on one of said objects, said core comprising at least two plates of magnetic material, at least one plate of insulating material, each of said magnetic plates and said insulating plates having a thickness substantially equal to half said center-to-center spacing, and means fastening said magnetic plates and said insulating plates together in a stack to form said core comprising alternate magnetic plates and insulating plates, said core being adapted to be mounted on the other of said objects in the vicinity of said pins.

2. A core adapted for use with a device to indicate the relative position of two objects, said device including a plurality of substantially similar elongated cylindrical pins of magnetic material each having substantially the same diameter and being arranged side by side for mounting on one of said two objects at a substantially uniform center-to-center spacing along a relative path of travel of said two objects, said core comprising a plurality of plates of magnetic material and a plurality of plates of insulating material, each of said plates having a thickness substantially equal to half said center-to-center pin spacing, and means holding said magnetic plates and said insulating plates together in a stack of magnetic plates alternated with insulating plates to form said core, said core being adapted to be mounted on the other of said two objects and coupled to said pins along said relative path of travel.

3. The assembly as claimed in claim 2 wherein each of said plates is generally C-shaped.

4. The assembly as claimed in claim 2 wherein each of said magnetic plates is laminated.

References Cited in the file of this patent
UNITED STATES PATENTS

| | | |
|---|---|---|
| 2,848,698 | Howey et al. | Aug. 19, 1958 |
| 2,853,402 | Blois | Sept. 23, 1958 |
| 3,010,063 | Rhoades | Nov. 21, 1961 |